United States Patent

[11] 3,599,541

[72] Inventor Robert J. Allen
Farmington, Mich.
[21] Appl. No. 826,928
[22] Filed May 22, 1969
[45] Patented Aug. 17, 1971
[73] Assignee Ex-Cell-O Corporation
Detroit, Mich.

[54] CONTAINER BLANK VARIABLE-SPEED FEEDER APPARATUS
8 Claims, 17 Drawing Figs.

[52] U.S. Cl. .................................................. 93/53 R,
93/530 R, 271/29
[51] Int. Cl. ...................................................... B31b 1/76
[50] Field of Search ............................................ 93/53 R, 53
UR, 53 M, 53 AC, 53 SD; 271/29

[56] References Cited
UNITED STATES PATENTS
2,936,681 5/1960 Earp ............................. 93/53
3,242,827 3/1966 Winters ........................ 93/53

Primary Examiner—Bernard Stickney
Attorney—James H. Bower

ABSTRACT: A container blank feeder apparatus for feeding containers in a collapsed form from a container magazine to a feeding station on a machine for erecting the containers for forming and filling operations, and which includes a base, a rotatable turret mounted on said base for rotation about a vertical axis, power means for rotating the turret at a constant angular speed in one direction, a plurality of suction cup means movably mounted for rotation about said vertical axis and for radial outward and inward movements relative to said turret for gripping and removing collapsed containers from the magazine and conveying them to said feeding station, and means operative in response to rotation of the turret about said vertical axis for rotating said suction cup means simultaneously with said turret between said container magazine and said feeding station, and for stopping each of said suction cup means at said magazine and moving them radially outward to grip a collapsed container in said magazine and thence radially inward to withdraw the container from said magazine and transfer it at constant speed to said feeding station.

Fig.1

INVENTOR.
ROBERT J. ALLEN
BY
James H. Bower
ATTORNEY

INVENTOR.
ROBERT J. ALLEN
BY
James H. Bower
ATTORNEY

INVENTOR.
ROBERT J. ALLEN
BY
James H. Bower
ATTORNEY

INVENTOR.
ROBERT J. ALLEN
BY
James H. Bower
ATTORNEY 3,599,541

CONTAINER BLANK VARIABLE-SPEED FEEDER APPARATUS

SUMMARY OF THE INVENTION

The present invention relates generally to an apparatus for fabricating coated paperboard containers, and more particularly, to a continuously operating variable-speed container feeder apparatus for removing containers in a collapsed form from a container magazine and squaring and transferring the containers to a feeder station on a continuous-motion-type machine for forming and filling the containers.

Container feeder apparatuses have been provided heretofore for continuous-motion-type forming and filling machines. One example of these prior art apparatuses is a container blank feeder mechanism disclosed in U.S. Pat. No. 2,936,681. The container feeder mechanism disclosed in this patent is capable of feeding containers to some types of continuous motion container forming and filling machines. However, it has a disadvantage in that its suction devices rotate at a constant speed with the turret so that it is not adaptable for use with high-speed container forming and filling machines. Other prior art container feeder apparatuses feed containers into a stationary chute and they also have the disadvantage of not being able to positively and accurately feed containers to a high-speed container forming and filling machine.

In view of the foregoing, it is an important object of the present invention to provide a novel and improved container feeder apparatus which overcomes the aforementioned disadvantages of the prior art container feeder apparatuses.

It is another object of the present invention to provide a container feeder apparatus which may be manually operated or automatically operated.

It is still another object of the present invention to provide a container feeder apparatus which is constructed and arranged to provide automatic and continuous feeding operations in a positive, fast and efficient manner.

It is a further object of the present invention to provide a novel and improved container feeder apparatus which includes, a rotatable turret that is mounted for rotation about a vertical axis at a constant angular speed, at least one suction cup means for gripping and removing a collapsed container from a container magazine and conveying it to a feeding station on a container forming and filling machine, and means operative in response to rotation of the turret about said vertical axis for rotating the suction cup means simultaneously with the turret between the container magazine and the feeding station, and for stopping the suction cup means at the magazine and moving it radially outward to grip a collapsed container in said magazine and thence moving it radially inward to withdraw the container from said magazine where after the suction cup means is then carried at the turret constant angular speed to the feeding station.

It is still a further object of the present invention to provide a novel and improved container feeder apparatus which includes a suction cup means movably mounted on a constant speed rotatable turret and which includes cam means for moving the suction cup means radially outward of the turret to stop the suction cup means relative to the turret to permit the suction cup means to grip and remove a collapsed container from a container magazine, and for thence withdrawing the suction cup means radially inward to permit it to be carried by the rotating turret to a feeding station on a container forming and filling machine.

It is still another object of the present invention to provide a container feeder apparatus for feeding containers in a collapsed form from a container magazine to a feeding station on a machine for erecting the containers for forming and filling, the combination comprising, a base, a rotatable turret mounted on said base for rotation about an axis, means for rotating said turret continuously at a constant angular speed in one direction, at least one suction cup means for gripping and removing a collapsed container from said magazine and conveying it to said feeding station, means for movably mounting said suction cup means for rotation about said axis and for radial outward and inward movements relative to said turret, and means operative in response to rotation of said turret about said axis for rotating said suction cup means simultaneously with said turret between said container magazine and said feeding station and for stopping said suction cup means at said magazine and moving it radially outward to grip a collapsed container in said magazine and thence moving it radially inward to withdraw the container from said magazine and transfer it at constant speed to said feeding station.

Other objects, features and advantages of this invention will be apparent from the following detailed description, appended claims, and the accompanying drawings.

DESCRIPTION OF THE PREFERRED EMBODIMENT

Figure 1:
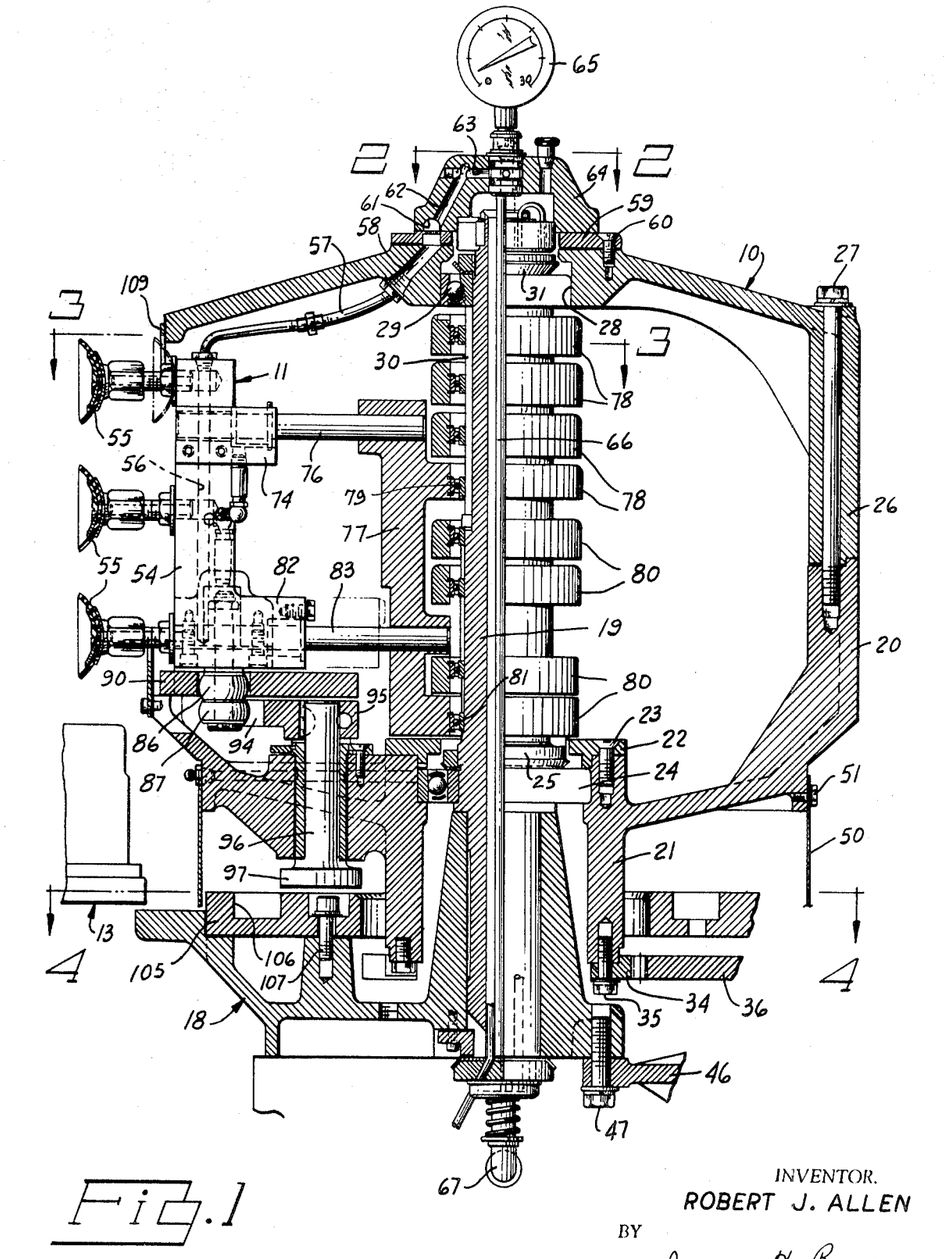
FIGS. 1 and 1A comprise a fragmentary, elevational section view of a collapsed container blank variable speed feeder mechanism made in accordance with the principles of the present invention.
Figure 16:
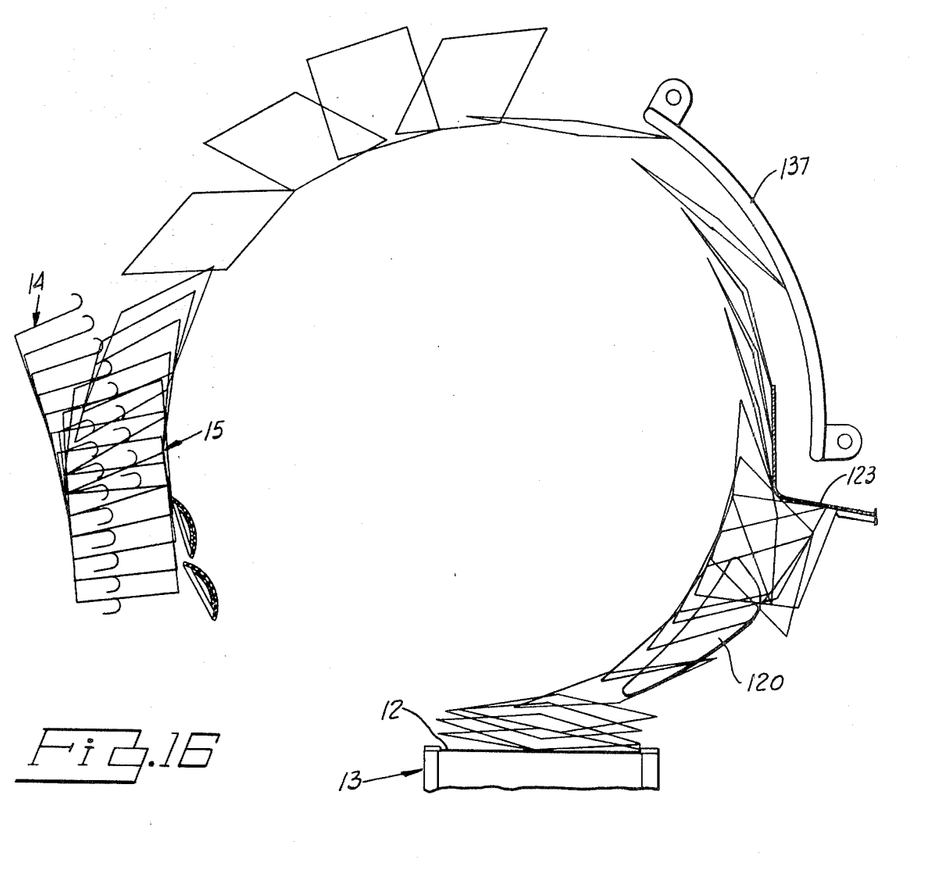
FIG. 16 is a development plan view of the container backbreaking, guiding, and feeding action of a container as it is moved from a container magazine to a bottom-forming station.

Referring now to the drawings, and in particular to FIG. 1, the numeral 10 generally designates the rotary turret of an illustrative embodiment of the invention. The rotary turret 10 is provided with a plurality of suction cup assemblies 11, as for example four in number, which are adapted to be moved in a predetermined manner so as to remove a collapsed container from a container magazine and move it through a backbreaking and opening or squaring path to a load or feeding station on a container forming and filling machine. As illustrated in FIG. 16, the numeral 12 designates a conventional collapsed container which is removed by the feeder apparatus of the present invention from a container magazine generally indicated by the numeral 13 and moved through a circular path to a feeding station 15 where it is mounted on a continuous motion container bottom-forming carrier generally indicated by the numeral 14 on a continuous-motion-type container forming and filling machine.

Figures 2, 4, 8:
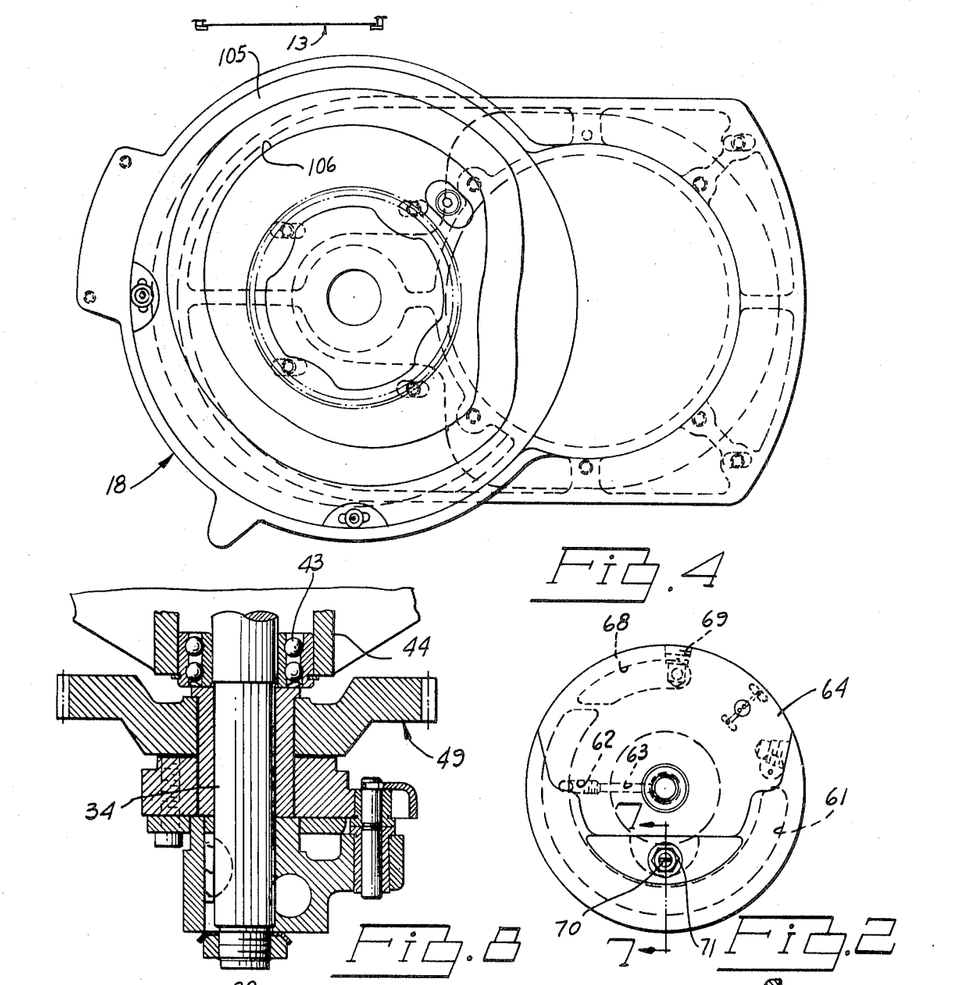
FIG. 2 is a fragmentary plan view of the structure illustrated in FIG. 1, taken along the line 2–2 thereof, and looking in the direction of the arrows.
FIG. 4 is a horizontal section view of the structure illustrated in FIGS. 1 and 1A, taken along the line 4–4 thereof, with parts removed, and looking in the direction of the arrows.
FIG. 8 is an elevational section view of the lower end of the turret drive shaft shown in FIG. 1A.

A container feeder apparatus of the present invention includes a base or supporting frame structure generally indicated by the numeral 18 in FIGS. 1 and 4. It will be understood that the base 18 would be mounted on the general base of a continuous motion container forming and filling machine. A detailed relationship of a container feeder apparatus to a container forming and filling machine is illustrated in the aforementioned U.S. Pat. No. 2,936,681. This patent also shows the general overall plan view of a rotary container feeder mechanism of the general type involved in the present invention.

Figure 1A:
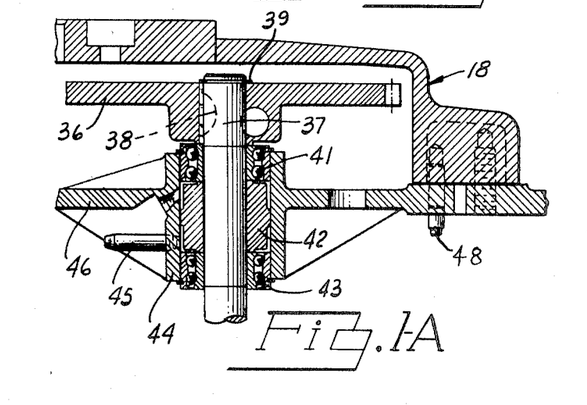

As shown in FIG. 1, a stationary vertical shaft 19 is fixed on the base 18. The turret 10 comprises a lower portion 20 which includes a sleeve shaft 21 that is rotatably mounted on the shaft 19 by a ball bearing means 24. The outer race of the ball bearing means 24 is secured to the turret sleeve shaft 21 by a bearing retainer 22 and a plurality of machine screws 23. The locknut 25 secures the inner race of the ball bearing means 24 to the shaft 19. The turret 10 includes an upper portion 26 which is secured by a plurality of bolts 27 to the lower turret portion 20. The turret upper portion 26 is provided with an axial stepped bore 28 in which is operatively mounted a ball bearing means 29 for rotatably supporting the upper end of the turret 10 on the shaft 19. The bearing 29 is fixed in an axial position on the shaft 19 by a spacer sleeve 30 and a locknut 31. The turret 10 is provided with a constant angular speed by a powered gear drive means. As shown in FIG. 1, a ring gear 34 is secured by a plurality of machine screws 35 to the lower end of the sleeve shaft 21. The ring gear 34 meshes with and is driven by a drive gear 36. As shown in FIG. 1A, the drive gear 36 is fixed by a key 38 to the upper end of a shaft 37. The shaft 37 also is provided with a releasable retainer ring 39. The shaft 37 is rotatable mounted by a pair of bearing members 41 and 43 in a tubular housing 44. The bearings 41 and 43 are spaced apart by a spacer sleeve 42. The housing 44 is provided with a lubrication nipple or fitting 45. The tubular housing 44 is carried by a plate 46 that is secured at its inner end to the frame 18 by machine screws 47 (FIG. 1). As shown in FIG. 1A, the outer end of the plate 46 is retained in place relative to the frame 18 by a dowel pin 48.

As shown in FIG. 8, A drive gear 49 is fixedly connected to the lower end of the drive shaft 37. The drive gear 49 is adapted to be connected to any suitable constant-speed power source, as for example, to the main power source of the continuous motion container forming and filling machine with which the feeder apparatus is associated.

As shown in FIG. 1, the turret 10 is provided with a cover or skirt 50 that depends from the lower end of the turret and which is connected thereto by a plurality of machine screws 51.

Figures 6, 9:
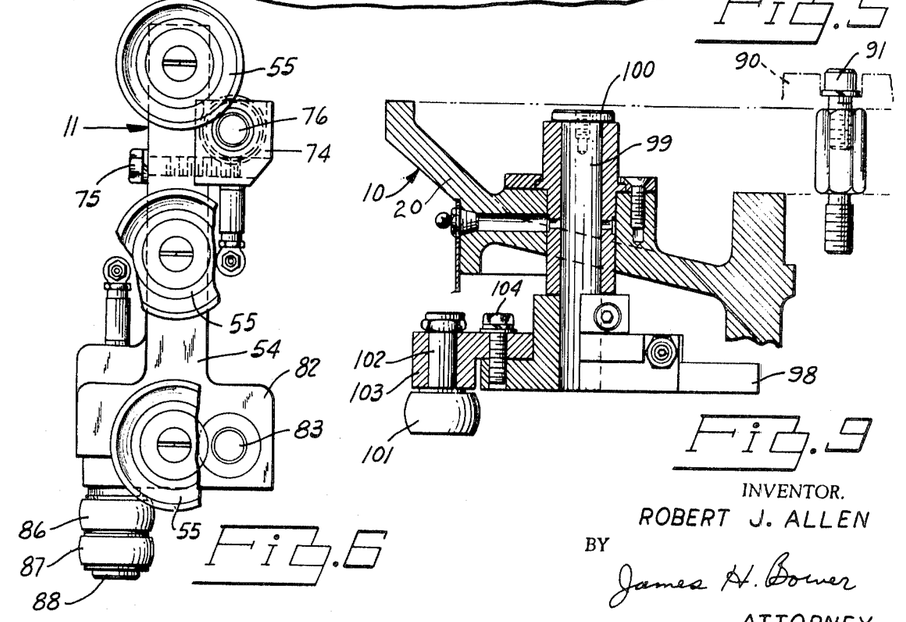
FIG. 6 is a view similar to that of FIG. 5 but with the turret cover removed to show the suction cup carrier assembly.
FIG. 9 is a fragmentary, elevational section view of the structure illustrated in FIG. 3, taken along the line 9–9 thereof, and looking in the direction of the arrows.
Figure 7:
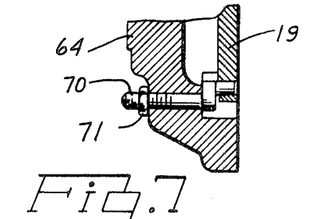
FIG. 7 is a fragmentary, elevational sectional view of the structure illustrated in FIG. 2, taken along the line 7–7 thereof, and looking in the direction of the arrows.

As shown in FIGS. 1 and 6, the suction cup assemblies 11 each comprise a suction cup carrier 54 which is a substantially elongated vertical member to which is operatively mounted a plurality of vertically disposed and spaced-apart conventional suction cups 55. As shown in FIG. 1, a longitudinally extended passage 56 is formed through the suction cup carrier 54 and it communicates with each of the suction cups 55. A flexible tubing 57 connects the upper end of the passage 56 to a passage 58 formed in the upper end of the turret upper portion 26. The passage 58 extends through a wear plate 59 which is secured to the top of the turret 10 by machine screws 60. The passage 58 communicates with a semicircular vacuum passage 61 in a valve 64 which is shown in plan in FIG. 2. The passage 61 is formed in the bottom surface of the valve 64 and it also communicates with the passages 62 and 63 that are in turn connected to a vertical tube 66 that passes downwardly through the vertical shaft 19. A suitable vacuum gage 65 is connected to the passage 63 at its junction point with the tube 66. The lower end of the tube 66 is indicated by the numeral 67 and it would be connected to a suitable source of subatmospheric air pressure for purposes of exerting a vacuum on the suction cups 55 at a predetermined time to grip a container and remove it from the container magazine. As shown in FIG. 2, the valve 64 further includes a second but shorter arcuate passage 68 which may be selectively connected through the inlet port 69 to alternate sources of vacuum or higher air pressure for holding containers, and releasing containers at the feeding station to insure fast release of the containers. As shown in FIG. 7, the valve 64 is connected by a stud 70 and the locknut 71 to the upper end of the shaft 19. Manually operated valves (not shown) may be provided to cut off the source of subatmospheric pressure to the passages 61 and 68 when it is desired to rotate the turret 10 without picking up collapsed containers from the magazine 13. The magazine 13 would be disposed to the left of valve 64, as viewed in FIG. 2.

As shown in FIG. 1, the suction cup carrier 54 has secured thereto an upper guide member 74. As shown in FIG. 6, the guide member 74 is secured to the suction cup carrier 54 by a suitable machine screw 75. The guide member 74 slidably receives the outer end of an upper horizontal shaft 76. As shown in FIG. 1, the inner end of the shaft 76 is fixed by any suitable means, as by a press fit, in the upper end of a vertically disposed carrier bracket 77. The bracket 77 is provided with an integral upper circular housing 78 in which is operatively mounted a suitable bearing means 79 for rotatably mounting the circular housing 78 on the vertical shaft 19. The lower end of the bracket 77 is also provided with an integral lower circular housing 80 in which is operatively mounted a suitable bearing means 81 for rotatably mounting the housing 80 on the vertical stationary shaft 19. The suction cup carrier 54 is also provided with a lower guide member 82 which is formed integral with the carrier 54 and which slidably receives the outer end of a lower horizontal shaft 83. The inner end of the shaft 83 is fixedly mounted, as by a press fit, in a suitable bore in the lower end of the bracket 77. It will be seen that the last-described structure provides a means for movably mounting the suction cup means 11 for rotation about the vertical axis of the feeder mechanism and for radial outward and inward movement relative to the turret 10.

Figure 3:
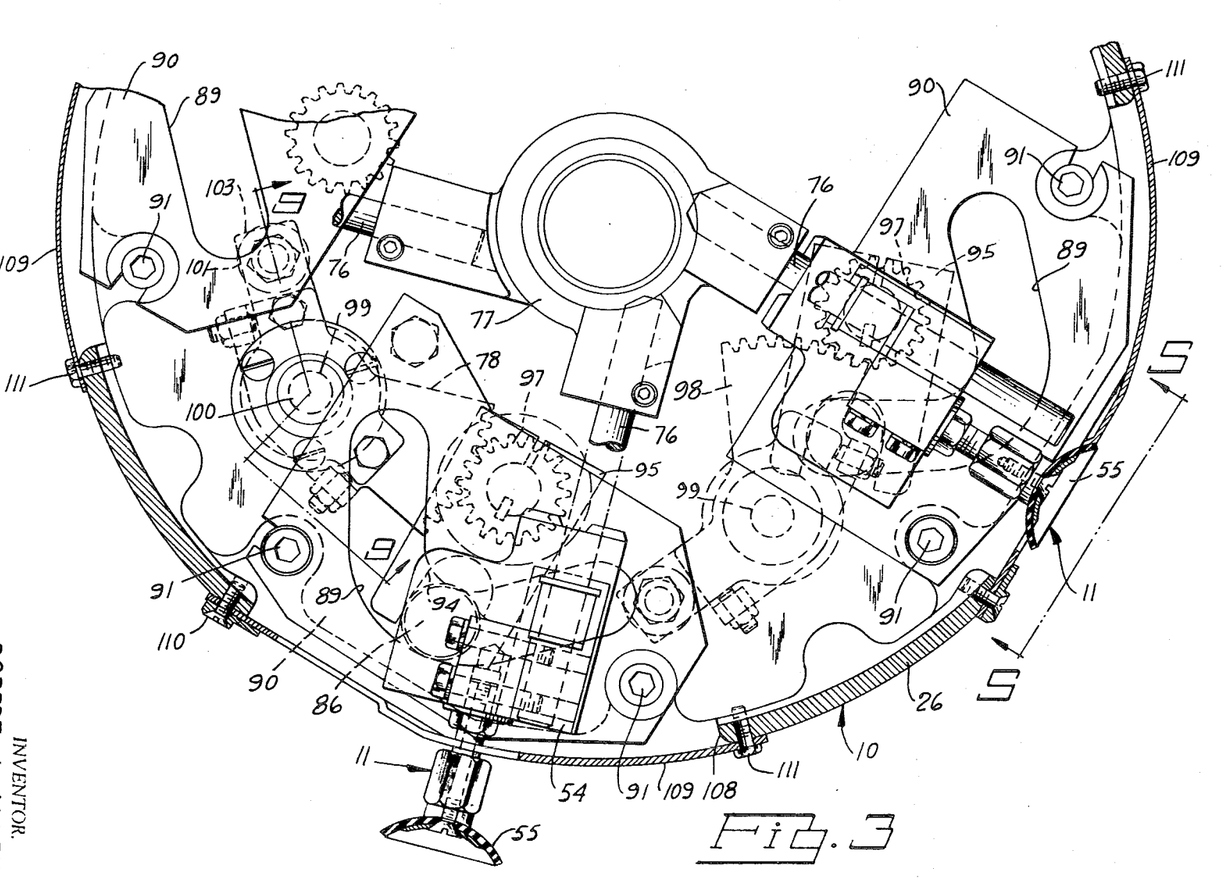
FIG. 3 is a fragmentary, enlarged, horizontal section view of the structure illustrated in FIG. 1, taken along the line 3–3 thereof, and looking in the direction of the arrows.

As shown in FIGS. 1 and 6, the suction cup carrier 54 is provided on the lower end thereof with a pair of vertically aligned upper and lower cam rollers 86 and 87, respectively. The cam rollers 86 and 87 are rotatably mounted on the lower end of the suction cup carrier 54 by means of a suitable shaft 88. As shown in FIG. 3, the upper cam roller 86 is adapted to be operatively mounted in a horizontal cam track 89 that is formed in an upper cam plate 90. The cam track 89 is substantially U shaped with the legs of the U spread sidewards to a slightly open position and with the bight portion facing outwardly. The upper cam plate 90 is adapted to be secured to the frame of the turret lower portion 20 by any suitable means, as by the machine screws 91. It will be seen that the upper cam 89 thus forms a means for moving the suction cups 55 with the turret 10 at a continuous constant speed in coaction with the hereinafter-described lower cam means.

As best seen in FIG. 1, the lower cam roller 87 is mounted in a cam slot 94 which is formed in the outer end of a yoke 95 that is fixed to the upper end of a rotatably mounted vertical shaft 96. The shaft 96 is suitably mounted for rotation in the lower portion 20 of the turret 10 and it carries on its lower end a gear 97. As shown in FIG. 3, the gear 97 is meshed with and is driven by a gear segment 98 formed on a carrier that is fixedly mounted to the lower end of a rotatable shaft 99. As shown in FIG. 9, the shaft 99 is rotatably mounted in the lower portion 20 of the turret 10 by means of the retainer screw 100.

A cam roller or follower 101 is rotatably mounted on the lower end of a shaft 102 that is operatively mounted on an arm 103 which is attached by a machine screw 104 to the gear segment carrier on the end thereof opposite to the gear segment 98.

As shown in FIGS. 1 and 4, a lower cam plate 105 is mounted by machines screws 107 to the base 18. A continuous cam track 106 is formed on the upper face of the cam plate 105, and it receives and guides the cam roller 101 when the turret 10 is rotated. It will be seen from an inspection of FIG. 14 that as the turret 10 rotates, the cam follower 101 will ride in the cam track 106 and rotate the gear segment 98 which will in turn rotate the gear 97 (FIG. 3). The gear 97 rotates the yoke 95 which in turn moves the cam follower 87 in the cam track 89 in the upper cam 90. The lower cam means thus functions to rock the suction cup assemblies 11 in relation to the turret 10 while the turret 10 is turning at a uniform constant angular speed. The rocking of the suction cup assemblies 11 creates a gain or loss of speed of the suction cup assemblies 11 in relation to the turret 10 so as to provide a stopping of the suction cup assemblies 11 at the magazine position, and radial outward and inward movements on the shafts 76 and 83 to withdraw a collapsed container from the magazine 13. It will be understood that all of the suction cup assemblies 11 are provided with similar upper cam structures and cam follower means and gear means for coaction with the lower cam track 106, and accordingly, the same reference numerals have been used for each of the suction cup assemblies in FIG. 3.

Figure 5:
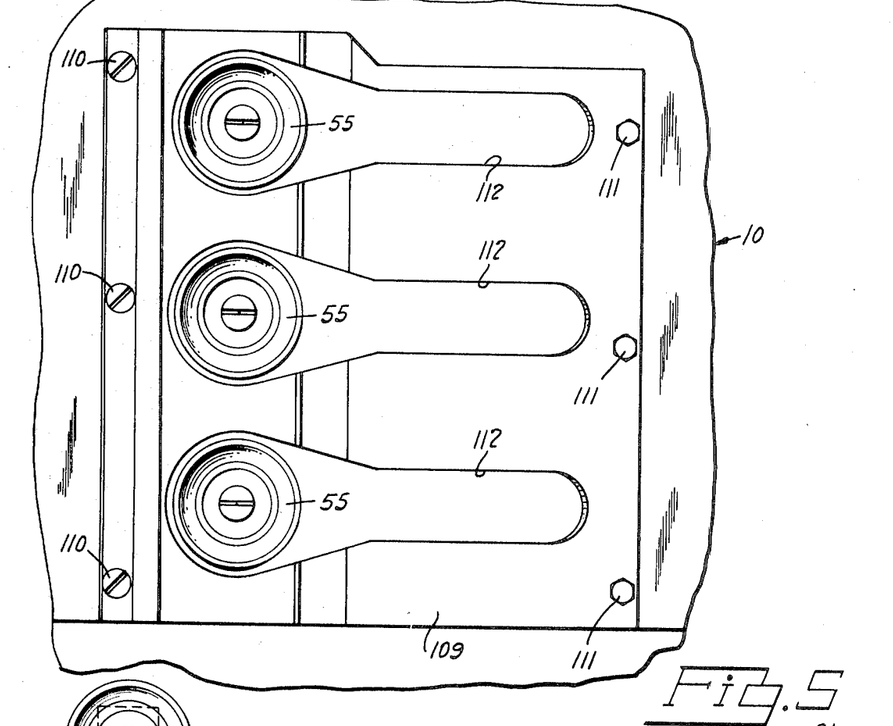
FIG. 5 is a fragmentary, enlarged, elevational view of the structure illustrated in FIG. 3, taken along the line 5–5 thereof, and looking in the direction of the arrows.

As shown in FIG. 3, the turret 10 is provided with openings 108 in the sidewalls thereof, and these openings are covered with suitable shields 109. As shown in FIG. 5, each of the shields 109 is secured to the turret 10 by suitable machine screws 110 and bolts 111. Each shield 109 is provided with a plurality of horizontally disposed circumferential openings 112 through which are extended the suction cups 55. The openings 112 permit movement of the suction cups 55 relative to the turret 10 during the time period when the suction cups 55 are removing a container from the magazine 13.

Figure 10:
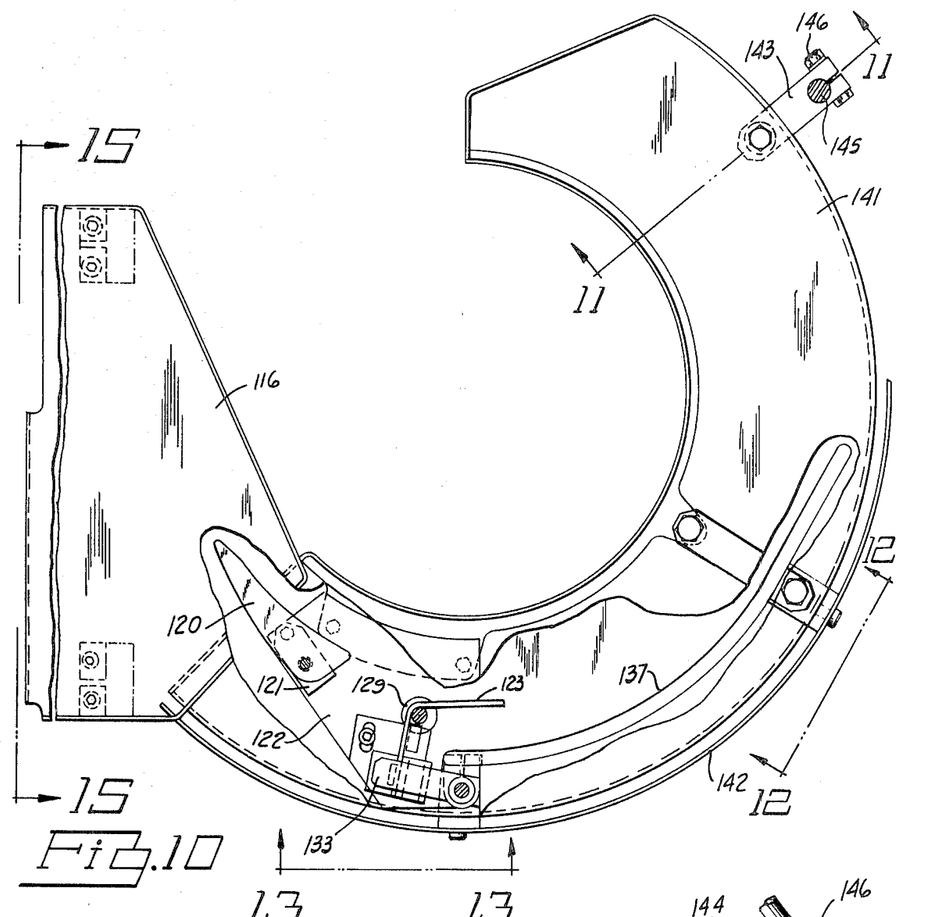
FIG. 10 is a plan view of the container backbreaker and guide means.
Figures 14, 15:
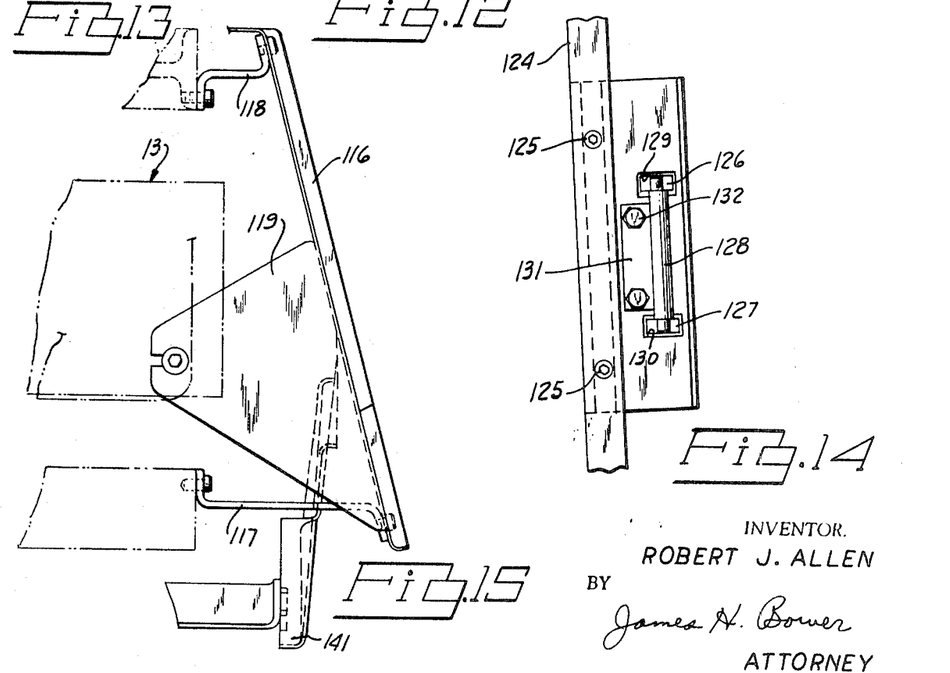
FIG. 14 is a fragmentary, elevational view of the structure illustrated in FIG. 13, taken along the line 14–14 thereof, and looking in the direction of the arrows.
FIG. 15 is a fragmentary, elevational view, turned 90°, of the structure illustrated in FIG. 10, taken along the line 15–15 thereof, and looking in the direction of the arrows.

As shown in FIGS. 10 and 15, a suitable dust cover 116 may be mounted over the area where the feeder mechanism withdraws containers 12 from the magazine 13. The dust cover 116 may be supported by any suitable means, as for example, brackets 117, 118 and 119, which are secured by any suitable means to the machine structure supporting the magazine and feeder mechanism.

Figures 12, 13:
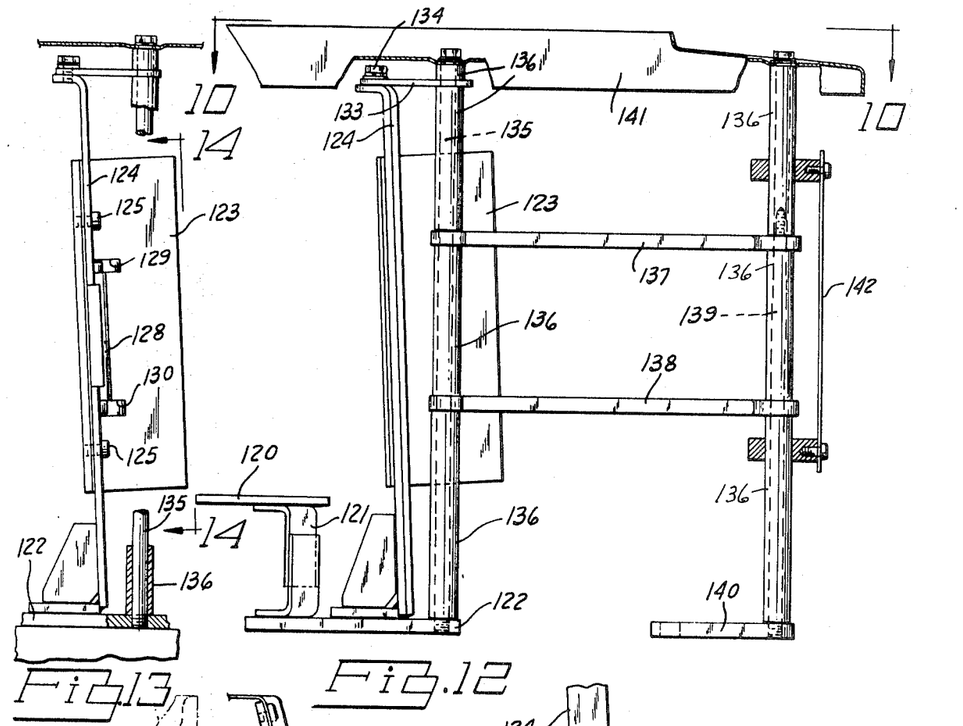
FIG. 12 is a fragmentary, perspective view of the structure illustrated in FIG. 10, taken substantially in the direction of the arrow "12."
FIG. 13 is a fragmentary, perspective view of the structure illustrated in FIG. 10, taken substantially in the direction of the arrow "13."

As shown in FIG. 16, the feeder mechanism withdraws the collapsed containers 12 from the magazine 13 and carries them through an approximate 270° circular path to the feed station 15 on an associated container forming and filling machine. The movement of the containers 12 through the last-mentioned path is a continuous motion. The suction cups 55 punch inwardly at the stack of containers 12 in the magazine 13, and pull a container out from the magazine 13. FIG. 16 shows the progressive movements of the container 12 as it is moved through the feeding path. The container 12 opens as it is pulled from the magazine 13 and continued motion moves it against a shoe 120 which opens the container. The shoe 120 engages the bottom end flap of the container and causes the container to open. Continued movement forces the container against a restriction member 123 which backbreaks or causes the container to back-fold. The container is then moved along the guide rails 137 and 138 (FIG. 12). After the container slides off the end of the guide rails 137 and 138, it snaps to an open squared position for movement to the feeding station 15 and the reception of a vertical movable bottom-forming carrier on an associated bottom forming and filling machine.

FIG. 16 is a development drawing and illustrates the last-described continuous transfer action. Any suitable shoe 120, restriction means 123, and guide rails 137 and 138 may be used. FIGS. 12 through 15 illustrate generally one illustrative embodiment of the last-mentioned structure.

As shown in FIGS. 10 and 12, the illustrative shoe 120 is fixedly mounted by any suitable means on the upper end of a U-shaped bracket 121. The bracket 121 is fixed on a suitable mounting plate 122 that is adapted to be secured to the feeder mechanism support base structure by any suitable means.

As shown in FIGS. 10, 12 and 13, the restriction member 123 is shown in the form of an angle plate which is secured to a vertical post 124 by a plurality of machine screws 125. The angle member 123 carries a pair of vertically spaced-apart rollers 126 and 127. The rollers 126 and 127 are rotatably mounted on a shaft 128 that is secured to a plate 131. The plate 131 is attached to the angle member 123 by suitable machine screws 132. The rollers 126 and 127 extend through holes 129 and 130 formed through the angle member 123 for rolling engagement with the containers 12 as they are moved against the restriction member 123.

Figure 11:
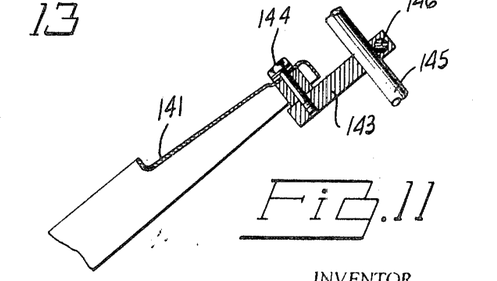
FIG. 11 is a fragmentary, elevational section view of the structure illustrated in FIG. 10, taken along the line 11–11 thereof, and looking in the direction of the arrows.

The post 124 is fixedly secured to a mounting plate 122. The guide rails 137 and 138 are arcuate in plan view, as illustrated in FIGS. 10 and 16, and they are carried by a pair of spaced-apart vertical posts 135 and 139, respectively. The post 135 is threadably mounted at its lower end to the mounting plate 122. The post 139 is threadably mounted at its lower end to a mounting plate 140 which is adapted to be supported by the feeder mechanism support base structure. The guide rails 137 and 138 are spaced on the shafts 135 and 139 by suitable spacer sleeves 136. As shown in FIG. 12, the upper end of the post 124 is connected to the post 135 by the support arm 133 and the screw 134. A suitable dust cover 141 is illustrated in FIGS. 10 and 11 as being mounted over the container transfer path about the position of the turret 10.

As shown in FIGS. 10 and 12 a suitable shield 142 may also be supported by the posts 135 and 139. As shown in FIG. 12 the dust cover 141 may be supported on the upper ends of the posts 135 and 139. As shown in FIGS. 10 and 11, the dust cover 141 is further supported by the arm 143 which is secured to a vertical support post 145 by a lock bolt 146. A screw 144 connects the arm 143 to the dust cover 141.

It will be seen that the foregoing structure provides a container feeder apparatus for removing collapsed containers from a magazine, squaring them out, and discharging them to a continuous motion bottom forming and filling machine. As described hereinbefore, the turret 10 is rotated at a constant angular speed, and by means of the cam 90, the plurality of suction cup assemblies 11 are rotated along with the turret 10 around the vertical shaft 19. The action of the cam rollers 101 functions to provide the aforedescribed radial inward and outward movements of these suction cups 55 at a predetermined point in the rotation of each cup assembly so as to withdraw a container from the magazine 13. Continued rotation of the cup assemblies 11 then moves the containers 12 into engagement with the shoe 120 to open the containers. Further movement brings the containers 12 into backbreaking engagement with the restriction member 123 and into guiding contact with the rails 137 and 138. After the containers leave the rails 137 and 138, they snap out to approximately a squared position and they are ready for discharge at the feeding station 15.

It will be understood that the feeder apparatus of the present invention may be provided with suitable manual and automatic controls so that the feeder apparatus may be manually operated for setting-up purposes for production runs and product changes. The novel combination cam and gear means which is used for controlling the movements of the suction cup assemblies 11 relative to the turret 10 provide a feeder mechanism which is more versatile than the prior art feeder devices. It will be understood that the various movements of the cup assemblies 11 may be changed as desired to provide variation in the inward and outward movements of the cup assemblies 11 by changing the configurations of the upper and lower cams.

While it will be apparent that the preferred embodiment of the invention herein disclosed is well calculated to fulfill the objects above stated, it will be appreciated that the invention is susceptible to modification, variation and change.

What I claim is:

1. In a container blank feeder apparatus for feeding containers in a collapsed form from a container magazine to a feeding station on a machine for erecting the container for forming and filling, the combination, comprising:
   a. a base;
   b. a rotatable turret mounted on said base for rotation about an axis;
   c. means for rotating said turret continuously at a constant angular speed in one direction;
   d. at least one suction cup means for gripping and removing a collapsed container from said magazine and conveying it to said feeding station;
   e. means for movably mounting said suction cup means for rotation about said axis and for radial outward and inward movements relative to said turret; and,
   f. means operative in response to rotation of said turret about said axis for rotating said suction cup means simultaneously with said turret between said container magazine and said feeding station, and including a cam means for stopping said suction cup means at said magazine and moving it radially outward to grip a collapsed container in said magazine and thence moving it radially inward to withdraw the container from said magazine and transfer it at constant speed to said feeding station.

2. A container blank feeder apparatus as defined in claim 1, wherein:
   a. said means for rotating said turret at a constant angular speed includes a power-operated gear drive means.

3. A container blank feeder apparatus as defined in claim 1, wherein:
   a. said feeder apparatus includes a plurality of said suction cup means.

4. A container blank feeder apparatus as defined in claim 1, including:
   a. means disposed adjacent said turret for engagement with a container on suction cup means when it is moved from said magazine to said feeding station for opening and back-folding the container to open the same.

5. A container blank feeder apparatus as defined in claim 1, wherein said means for movably mounting said suction cup means comprises:
   a. a carrier bracket rotatably mounted on said base about said axis;
   b. at least one shaft fixed on said carrier bracket and extended radially outward therefrom; and,
   c. said suction cup means being slidably mounted on said shaft.

6. A container blank feeder apparatus as defined in claim 5, wherein said means operative in response to rotation of said turret for rotating said suction cup means, comprises:
   a. a first cam means mounted on said turret;
   b. a first cam roller mounted on said suction cup means and operatively engaged with said first cam means;
   c. a second cam means fixed on said base; and,
   d. means operatively engaged with said second cam means and operatively connected with said suction cup means, whereby said suction cup means is simultaneously moved with said turret between said container magazine and feeder station, and said suction cup means is stopped at said magazine and moved radially outward to grip a container in said magazine and thence is moved radially inward to withdraw the container from said magazine.

7. A container blank feeder apparatus as defined in claim 6, wherein said means operatively engaged with said second cam means and operatively connected with said suction cup means, comprises:
   a. a second cam roller mounted on said suction cup means;
   b. a first shaft rotatably mounted on said turret in a position spaced apart from said turret axis and parallel thereto;
   c. a yoke fixed on one end of said first shaft and having an elongated cam track in which is operatively received said second cam roller;
   d. a gear carried on the other end of said first shaft;
   e. a second shaft rotatably mounted on said turret in a position spaced apart from said turret axis and parallel thereto;
   f. a gear segment carried on said second shaft and meshed with said gear on said first shaft; and,
   g. a third cam roller attached to said gear segment and operatively engaged in said second cam means fixed on said base.

8. A container blank feeder apparatus as defined in claim 7, wherein said suction cup means comprises:
   a. a vertically disposed carrier slidably mounted on said shaft on said carrier bracket;
   b. a plurality of aligned suction cups operatively mounted on said carrier; and,
   c. said first and second cam rollers being operatively mounted on said carrier.